(No Model.) 3 Sheets—Sheet 1.
E. C. SOOY.
BALING PRESS.
No. 363,012. Patented May 17, 1887.
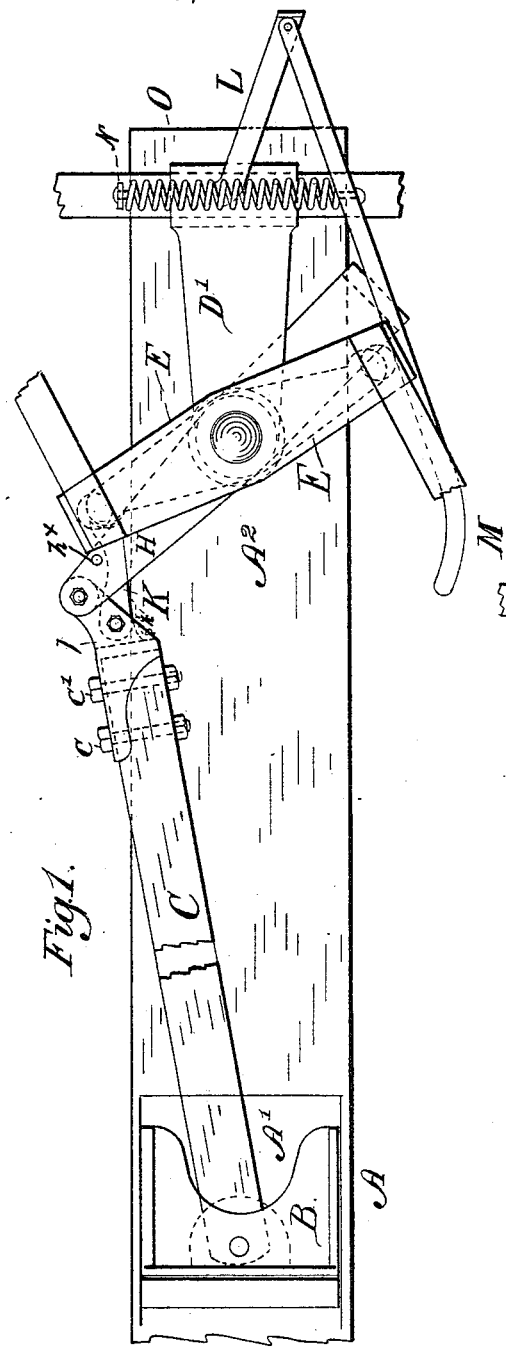
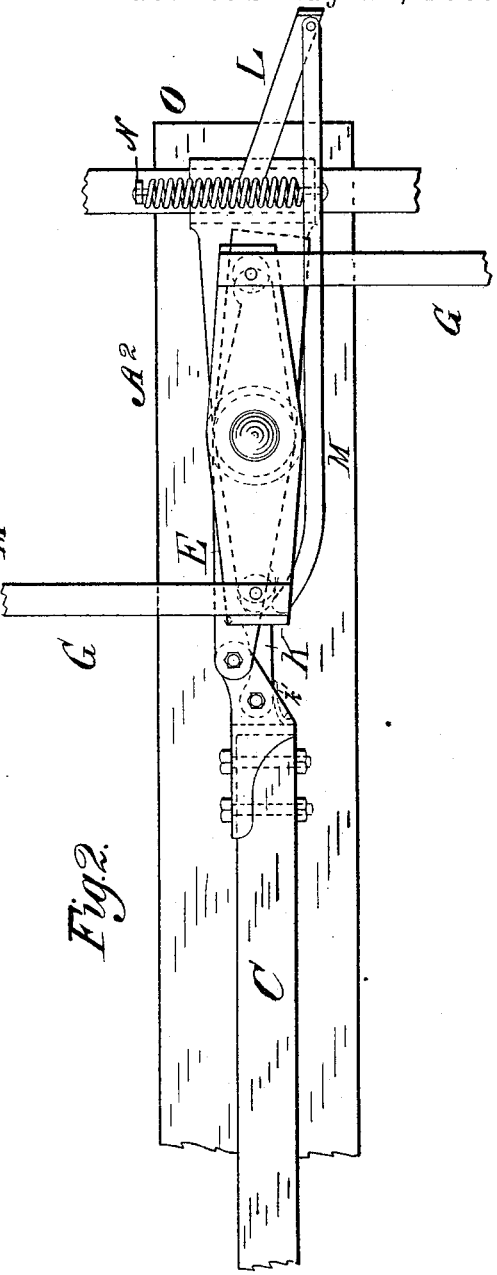
WITNESSES:
Thomas A. Lee
Edmund S. Bigelow
INVENTOR
Ephraim C. Sooy.
BY
Rich'd H. Manning
ATTORNEY (No Model.) 3 Sheets—Sheet 2.

E. C. SOOY.
BALING PRESS.

No. 363,012. Patented May 17, 1887.

WITNESSES: INVENTOR (No Model.) 3 Sheets—Sheet 3.
E. C. SOOY.
BALING PRESS.
No. 363,012. Patented May 17, 1887.
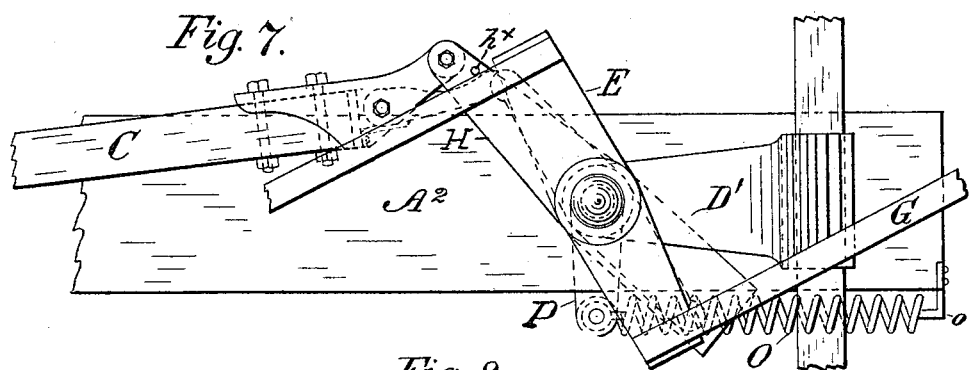
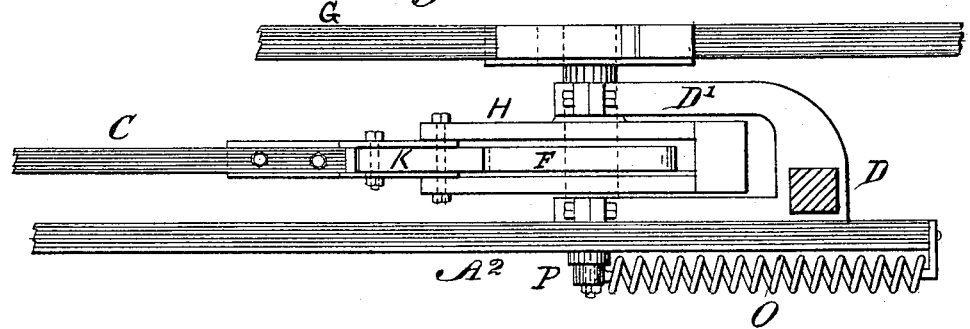
WITNESSES:
INVENTOR
Ephraim C. Sooy
BY
Rich. H. Manning
ATTORNEY

UNITED STATES PATENT OFFICE.

EPHRAIM C. SOOY, OF KANSAS CITY, MISSOURI.

BALING-PRESS.

SPECIFICATION forming part of Letters Patent No. 363,012, dated May 17, 1887.

Application filed September 9, 1886. Serial No. 213,060. (No model.)

*To all whom it may concern:*

Be it known that I, EPHRAIM C. SOOY, a citizen of the United States, residing at Kansas City, in the county of Jackson and State of Missouri, have invented certain new and useful Improvements in Baling-Presses; and I do hereby declare that the following is a full, clear, and exact description of the invention, which will enable others skilled in the art to which it appertains to make and use the same, reference being had to the accompanying drawings, forming a part of this specification.

My invention has for its object to obtain in a baling-press and in connection with the horse or other suitable driving power thereto a power-receiver for the storage of power during the intervals in which the pitman returns for a new stroke and during the first half of the stroke, and which accumulated power shall be applied simultaneously with the driving-power to accelerate the force of the pitman, thus equalizing the momentum and doubling the power, less the friction, at the time when it is most needed, and checking the sudden motion forward which results from disconnecting the power from the pitman at the end of each stroke; secondly, to increase the stroke of the pitman without increasing the length of the crank, and also lessen the length of the crank and obtain more power to expend upon the pitman; and, thirdly, to facilitate the passage of the crank around the dead-center of the pitman without friction; and it consists in the novel combination and arrangement of parts hereinafter fully described, and specifically pointed out in the claims.

Figure 3:
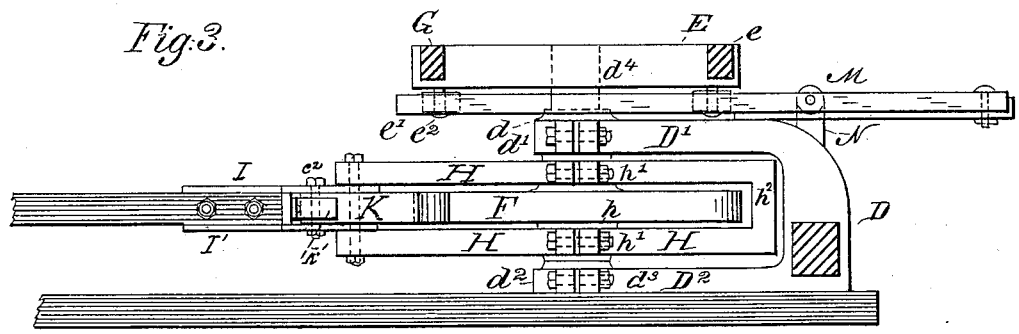
Figure 4:
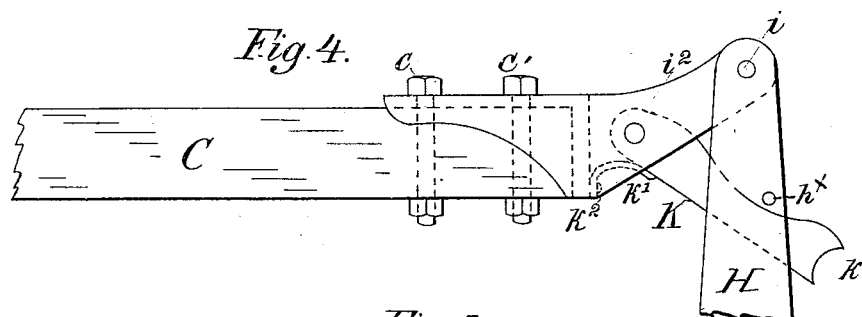
Figure 5:
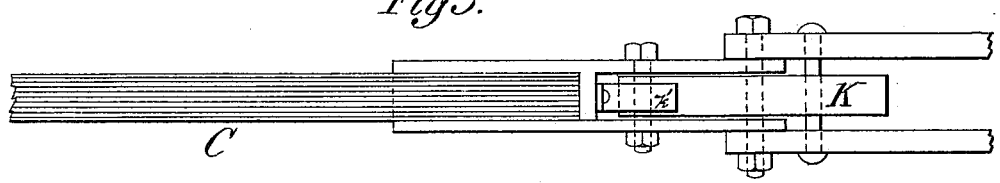
Figure 6:
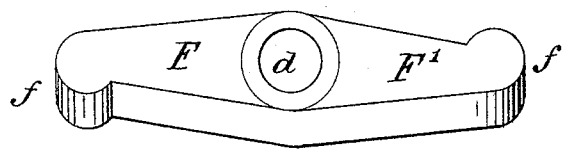

In the drawings, Figure 1 is a plan view showing a portion of the baling-press, the plunger therein, and pitman, and also the rotating crank and yoke for the horse-power, and spring and lever for storing power, the pitman being shown in a retracted position, and the combined power acting to compress the bale. Fig. 2 is a plan view of the power mechanism as seen in Fig. 1, and a portion of the pitman, showing the pitman and crank upon a dead-center and the relative position of the power-storing devices. Fig. 3 is a longitudinal elevation of the power mechanism, and showing a portion of the pitman. Fig. 4 is a plan view in detail of a portion of the pitman thrown back in a position to receive the stroke of the crank, also showing a portion of the guide-arm, the link, and spring for retaining the toggle-lever in position. Fig. 5 is a side view in detail of the portion of the pitman, guide-arms, and link, as seen in Fig. 4. Fig. 6 is a plan view of the double-armed crank. Fig. 7 is a plan view as seen in Fig. 1, showing an alternate form of applying the coiled spring through the medium of a lever on the crank-shaft. Fig. 8 is a longitudinal elevation of the power-storing devices as seen in Fig. 7.

In the construction of my improved power-press I arrange the same upon a continuation or portion, $A^2$, of the bed $A'$ of the baling-press A, which portion extends the proper distance longitudinally from said bed to afford the desired length of pitman, and in this arrangement a uniformity is insured in the distance of the recoil of the pitman, as well as preserving the accuracy of the stroke of the crank. I may, however, mount the power mechanism upon a separate bed suitably anchored, should it be preferred.

In the drawings Fig. 1, I have shown a portion only of the baling-press which receives the material to be baled, which is sufficient to illustrate the invention.

Within the press A is placed a reciprocating plunger, B, and to said plunger I pivotally attach one end of the pitman C. Upon the extreme end of the portion $A^2$ of the bed $A'$, which lies distant from the baling-press A, I attach an upright standard, D, from the upper end of which extends at right angles, and in the direction of the press A, a horizontal support, D', the height between the said support and said bed being sufficient to receive the parallel guiding-arms, and also the crank for conveying the power to the pitman. Upon the end of the support D', I form a journal-box, $d$, in opposite parts, which parts I secure together by the bolts $d'$. The opening in said journal-box $d$ is formed in a vertical relation to the bed $A^2$, and beneath said opening I form, in the end of a horizontal base, $D^2$, which extends along the upper surface of the bed $A^2$, and is cast with the standard D and support D' in one piece, a journal-box, $d^2$, said journal-box being cast in two parts and the said parts secured together by means of the bolts $d^3$, the opening in said journal-box being placed in the same vertical relation with the opening in the journal-box above. I then cast for the journal-boxes $d$ $d^2$ the driving-shaft $d^4$, which fits and rotates within said journal-boxes $d$ $d^2$ and extends a short distance above the support D', and upon said shaft I cast with or key fixedly thereto the yoke E and the two-armed crank F. The yoke E is a longitudinal thick plate attached midway its length to the upper end of the shaft $d^4$, and at suitable distance above the horizontal support D' to permit the depending rollers $e'$ to be attached to and beneath said yoke and avoid contact with said support D'. Through the opposite ends of the yoke E, I make the transverse openings $e$, in which are inserted the ends of the draft-poles G G from opposite sides, as seen in Fig. 2. The double-armed crank F F' is cast with or keyed fixedly upon the shaft $d^4$ in a position horizontal with the support D' and midway between the said support D' and the base $D^2$, to which the journal-box $d^2$ is attached, and is made with two arms, F F', which extend radially from the shaft $d^4$ and rotate in union with said shaft and between said shaft and the standard D. I then make, for the purpose of guiding the end of the pitman and directing its stroke within the radius of the arms of the crank F F', the guiding-arms H H, which are attached loosely to the shaft $d^4$ and extend from said shaft on opposite sides of the crank-arms F F'.

In constructing the arms H H, I cast the portions of the same around the shaft $d^4$ in two parts with outward flanges $h$ $h$, through which flanges are passed the nut-bolts $h'$. For convenience, the opposite ends of the portions of the arms H H upon one side of the shaft $d^4$ are united in casting by a transverse end piece, $h^2$, which is made to pass the end of the crank-arms F F' and between the said arms and the standard D, the length of the support D' being made sufficient to accommodate the desired length of arms which are placed upon the bed $A^2$. To prevent frictional contact, bosses are cast upon the opposite sides of the crank-arms F F' around the shaft $d^4$, which keep the arms of the crank and the guiding-arms the proper distance apart. Between the opposite ends of the guiding-arms H H opposite to that joined by the end piece, $h^2$, and to said ends, I pivotally attach the end of the pitman C opposite to that attached to the plunger B. For this purpose I attach to the end of the pitman C a casting composed of two upper and lower plates, I I', which are bolted to the end of the pitman C by the bolts $c$ $c'$. The plates I I' project beyond the end of the pitman a suitable distance and incline at an acute angle to the pitman C, or away from the arms F F' of the crank. The ends of the casting or plates which extend between the ends of the arms H H, I then pivotally attach together by the pivot $i$. I then make a link, K, of the proper length to extend to and connect with one of the arms F F' of the crank. One end of the link is attached to the plates I I' of the casting near to the end of the pitman and in rear of the pivotal point of the arm H to said casting by the bolt $i^2$, and the opposite end of said link is made with a groove or depression, $k$, to receive the end of the arms F F', which arms are made to taper toward the end, and which ends are provided with a rounded face, $f$, to fit within the groove $k$ of the link K. Upon the end of the pitman C, between the plates I I', I attach a flat spring, $k'$, which is bent at one end and secured to said pitman by the screw $k^2$, the opposite end extending along the side of the link K which is opposite the driving-shaft $d^4$. Upon the guiding-arm H, near the pivotal point of said arm to the casting I, I place a stud, $h^x$, against which the link abuts and is held in position to receive the stroke of the arms of the crank.

For the purpose of storing power I then extend outwardly from the top and rear end of the support D' horizontally a bar, L, said bar being inclined to one side or out of line with the standard D. To the extreme end of the bar L, I pivotally attach one end of a straight bar, M, which extends from the said bar L to a point slightly beyond the extreme end of the yoke E when said yoke is placed in line with the said pitman C, the end of said bar being bent at said end toward the said yoke to receive the released force of the power after passing the dead-center. Upon one side of the standard D, opposite to that along which the bar M extends, and upon the base $A^2$, I fixedly attach a standard, N, to the upper end of which I attach one end of a coiled spring, O, which is extended transversely over the support D', and the opposite end of said spring is attached to the side of the bar M in any suitable manner. Upon the under side and at each end of the yoke E, I place the rollers $e'$ $e'$, which rotate horizontally upon the pivots $e^2$ and contact with the bar M as the yoke rotates.

In Fig. 7 I have shown the coiled spring O arranged alongside of the bed $A^2$. In this construction I attach to the end of the bed $A^2$ an angle-iron, $o$, which extends a suitable distance from said side and end of the said bed to which one end of the coiled spring O is attached. The shaft $d^4$ is then made to extend through the bottom of the bed $A^2$ and a suitable distance beyond, upon which I rigidly attach a lever, P, and to said lever the opposite end of the coiled spring is attached. Thus it will be seen that, while the mechanism is essentially the same as in Fig. 1, the means for storing power is the same, with the exception of utilizing a lever on the crank-shaft to accomplish the same result.

In the operation of my improved power-press the pitman C, attached to the plunger B, in its reciprocal movements is guided by the pivotally-connected arm H, which moves in unison. The material to be baled in the press as soon as compressed in quantity exerts an outward expansive force upon the plunger, and upon the completion of a full stroke by the pitman, whereby compression of the material results therefrom, and upon the releasing of the power upon the pitman the pitman rebounds to a position in which the end of the said pitman and the arms of the crank are in a line at right angles to the bed of the press. In this position the link K is controlled by the stud $h^\times$, which throws the grooved end of said link in the direction of one of the rotating arms of the crank, compressing the spring $k'$ thereby. During the time in which the pitman rebounds and the time required for one of the arms to make one-half revolution and contact with the link on the end of the pitman, and which is necessary for feeding the material to the press, the power to operate the press, which is ordinarily unemployed, is transmitted by the yoke E to the lever M, one end of which yoke is thrown outwardly and draws upon the coiled spring O gradually, so as to place the said spring under its highest tension, which occurs when the yoke E is in a position at right angles to the support D', and as this point is passed the power of the spring-acting lever is thrown upon the yoke E to facilitate its rotation to a position in a longitudinal direction to the press, which power begins to act gradually upon the yoke, the arm upon the opposite side of the crank being in contact with the link when the combined power of the lever and spring are simultaneous in action. As the arms of the crank meet the link K, the face of which fits within the grooved end of said link, and upon the completion of the stroke of the pitman and in passing the dead-center the spring in contact with the link permits the said link to swing far enough to enable the arm to release the said lever without friction.

For the operation of the press by horse-power the draft-poles in yoke E are made of the proper length and the power attached thereto, the horses traversing the pitman when the rebound of the pitman has taken place, and it will be observed that the pitman rebounds at each time upon one side only of the driving-shaft.

Having fully described my invention, what I now claim as new, and desire to secure by Letters Patent, is—

1. In a baling-press, a crank and its shaft and a lever connected therewith, in combination with a spring which is alternately contracted and expanded during the rotation of said shaft, substantially as described.

2. The combination, in a baling-press, with a driving-crank shaft, of a lever connected therewith, a spring, a pitman, guiding-arms pivotally attached to said pitman and said shaft, a link on said pitman, and a crank on said shaft in the path of said link, for the purpose specified.

3. In a baling-press, the combination of a rebounding plunger and a pitman, a suitable bed, and a supporting-frame having a rear extension on said bed, a rotating driving-crank and its shaft supported upon said bed, and a yoke upon said shaft, and anti-friction devices on said yoke, guiding-arms pivotally attached to said pitman and said shaft, a link attached to said pitman, and a spring upon and attached to said supporting-frame at one end, and a lever attached to said rear extension of said frame and secured to an opposite end of said spring and in the path of the said anti-friction devices upon said yoke, for the purpose described.

4. The combination, with a pitman, of a rotary driving-crank and its shaft supported upon a suitable bed, and a guide-arm loosely attached to and extending radially from said shaft and pivotally attached to said pitman, and a link pivotally attached to said pitman in the path of the said crank on said shaft, as and for the purpose specified.

5. The combination, with a pitman, of a rotating driving-crank shaft supported upon a suitable bed, a guide-arm loosely attached to and extending radially from said shaft and pivotally attached to said pitman, a stud on said arm, a link pivotally attached to said pitman and one portion of said link bearing against said stud, and a spring upon said pitman bearing upon one side of a portion of said link and in a contrary direction to that given by said stud, for the purpose described.

6. The combination, in a baling-press having a suitable bed and a support upon said bed, of a rotating driving-shaft and a crank on said shaft on said support, and a yoke upon and rotating with said shaft, and a lever attached to said support at one end and having an opposite end extending to and within the radius of said yoke and contacting therewith, and a spring attached at one end to said support and also to said lever at a suitable distance from the end of said lever, for the purpose described.

EPHRAIM C. SOOY.

Witnesses:
FRED. W. PERKINS,
A. GRANT HOLMES.